United States Patent [19]
Lewis

[11] 3,985,468
[45] Oct. 12, 1976

[54] GAS TURBINE FUEL DELIVERY SYSTEM

[75] Inventor: Leon David Lewis, Rancho Palos Verdes, Calif.

[73] Assignee: The Garrett Corporation, Los Angeles, Calif.

[22] Filed: Dec. 24, 1974

[21] Appl. No.: 536,144

[52] U.S. Cl.............................. 417/214; 417/223; 74/665 C
[51] Int. Cl.².................... F04B 49/00; F16H 37/06
[58] Field of Search ............... 417/214, 42, 223, 15, 417/43; 310/105; 74/711, 665 A, 665 C

[56] References Cited
UNITED STATES PATENTS

| | | | |
|---|---|---|---|
| 704,574 | 7/1902 | Pintsch | 310/105 |
| 711,300 | 10/1902 | Earle | 310/105 |
| 726,536 | 4/1903 | Holz | 310/105 |
| 2,160,447 | 5/1939 | Turney | 417/214 |
| 2,317,135 | 4/1943 | Crittenden et al. | 417/42 |
| 2,377,199 | 5/1945 | Adams et al. | 417/214 |
| 2,403,332 | 7/1946 | Beviws | 417/214 |
| 2,485,126 | 10/1949 | Wood | 417/214 |

*Primary Examiner*—William L. Freeh
*Assistant Examiner*—G. P. LaPointe
*Attorney, Agent, or Firm*—Henry M. Bissell

[57] ABSTRACT

A fuel delivery system comprised of a differential having three associated shafts. A first shaft is rotated at a speed responsive to the engine speed and drives the differential. A second shaft is driven by the differential against a variable retarding torque, which torque varies the speed of the second shaft. A third shaft is driven by the differential and drives a variable speed, fixed displacement fuel pump at a speed responsive to the speed of the second shaft combined with the speed of the first shaft.

7 Claims, 4 Drawing Figures

3,985,468

GAS TURBINE FUEL DELIVERY SYSTEM

BACKGROUND OF THE INVENTION

1. Field of the Invention

This invention relates to fluid flow systems and, more particularly, to such systems employing positive displacement pumps.

2. Description of the Prior Art

A major problem involved in providing operational gas-turbine-powered automobiles lies in the different operating characteristics of the turbines, contrasted with presently-conventional power plants. No greater skill for competent operation of a gas-turbine-powered vehicle should be required than that for conventional vehicles; and, ideally, the controls and handling characteristics should appear the same to the driver.

One of the prime objectives of the automotive gas turbine control system is to obtain handling characteristics similar to those encountered in internal combustion power plants. Various approaches have been suggested, but most suffer from the fact that turbine engine control is compounded by the existence of two degrees of freedom—fuel flow and turbine nozzle orientation—as opposed to the single degree of freedom of the conventional combustion engine. While the present invention is not concerned with turbine nozzle orientation, apparatus suitable for use with an electronic computer is providing for regulating the fuel flow.

Steady state engine control requirements can be segregated into the two areas of fuel flow regulation and nozzle position control, corresponding to the two degrees of freedom. Expressed in simplest terms, the requirement reduces to inputting a particular engine fuel flow rate, and adjusting the nozzle position to assure optimum engine performance. The rate of engine fuel flow is essentially determined by the vehicle driver, with the control system performing a limiting function with respect to driver fuel demands. One suggested method of fuel flow modulation is to use an open loop type schedule wherein delivered engine fuel flow is a direct function of foot pedal (throttle) position. However, the characteristics of a regenerated engine are such that a substantial lag exists between the fuel flow disturbance and acquisition of gas generator steady state speed. Since gas generator speed is related directly to engine power, this lag can pose significant problems to the driver when stabilizing the vehicular velocity.

Conventional fuel delivery systems consist of a fuel pump and means for controlling fuel delivery to the engine. These functions are often accomplished by a positive displacement type fuel pump that is driven from the engine gear box, a flow control valve that modulates fuel flow to the engine, and a pressure relief valve that returns excess fuel flow to the pump inlet. The conventional hydromechanical fuel flow control valve is both complex and expensive.

U.S. Pat. No. 2,669,093 to Lee discloses a control apparatus for use with gas turbine engines. A planetary gear control mechanism provides an output in response to engine speed and a reference speed established by a hydraulic motor. A variable delivery fuel pump is driven by the engine. The pump is responsive to an output of the control mechanism to provide a varying fuel output to the engine. However, the Lee apparatus too is quite complex, and while perhaps acceptable for use in aircraft—for which it is designed—it is impractical for the mass—produced automotive market.

Other patents of which applicant is aware involving shaft speed control arrangements are U.S. Pat. Nos. 1,403,658 of Zweigbergk, 2,272,934 of Cotal and 2,847,876 of Willard.

SUMMARY OF THE INVENTION

The structure and operation of the invention are substantially as described in the foregoing Abstract, which is included herein by reference.

In brief, arrangements in accordance with the invention provide a differential gear mechanism having a first or input shaft driven by the engine. A second or control shaft and a third or output shaft are driven by the differential. Associated with the opposite end of the second shaft (in one embodiment) is an eddy current brake. The eddy current brake is responsive to a control current from external means to selectively develop a retarding force on the second shaft, causing the second shaft to rotate at a reduced speed with the result that the third shaft is thereby driven at increased speed. Thus the speed of the third shaft is controlled in accordance with the speeds of the first and second shafts. The third shaft is connected at its output end to a variable speed, positive displacement fuel pump. The output of the fuel pump varies in relation to the rotating speed of the third shaft, thus being responsive to both engine speed and operator control independently.

In a second particular arrangement in accordance with the invention, a control means in the form of a second fixed displacement pump is coupled to the second shaft in place of the eddy current brake. A variable flow valve connected to the output of the second pump is used to vary the load on the pump, thereby varying the speed of the first pump as driven by the differential.

In a third particular arrangement in accordance with the invention, a fourth shaft is provided and a variable eddy current coupler, controlled by associated control circuitry, is used to vary the degree of coupling between the second and fourth shafts, thus varying the speed of the first pump as driven by the differential.

It will be understood that arrangements in accordance with the present invention may be controlled in various ways. Fuel flow rate may be used as one of the control parameters, for example, and this may be metered directly or, because of the direct relationship between flow rate and fuel pump drive, by measuring the speed of rotation of the pump drive shaft. In some embodiments of the invention, the control input shaft may be accelerated as well as braked to increase the variable range of the fuel pump. A different drive source, rather than the associated engine, may be employed to drive the differential gear system and such may be controlled in accordance with other parameters if desired. Various control parameters may be applied such as engine speed and temperature, ambient temperature, fuel conditions, load, throttle setting, etc.

BRIEF DESCRIPTION OF THE DRAWINGS

A better understanding of the invention may be had from a consideration of the following detailed description, taken in conjunction with the accompanying drawings, in which.

3

Figure 3:
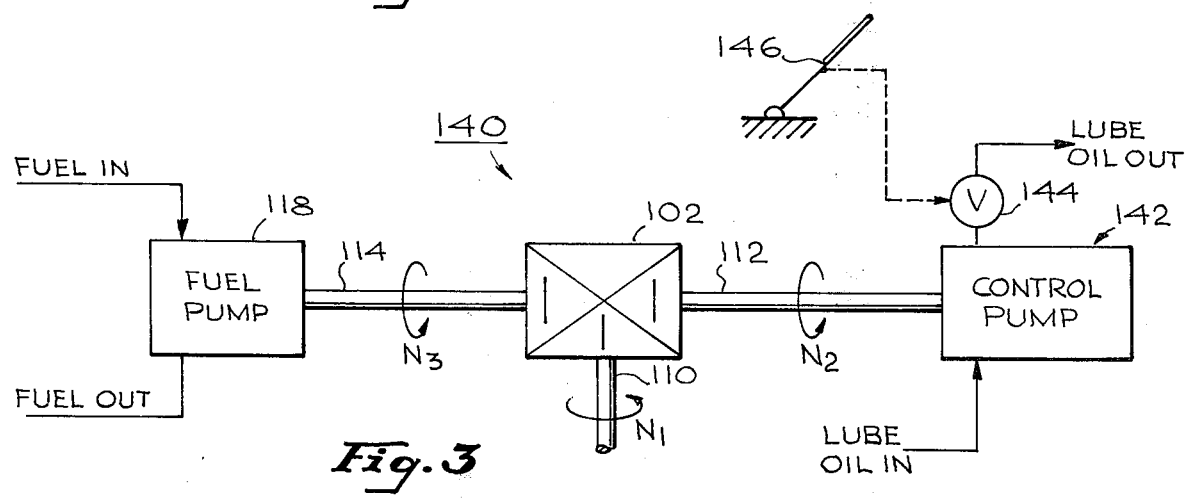
Figure 4:
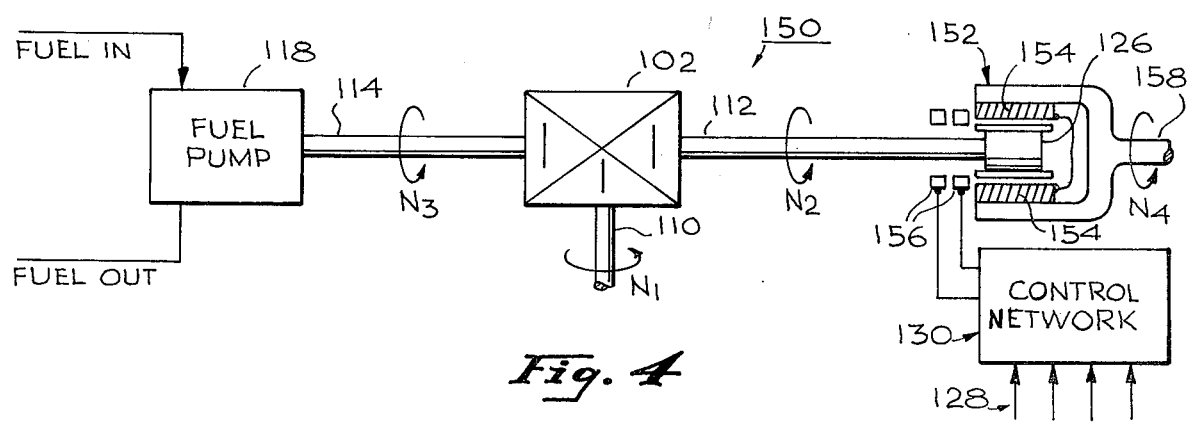

FIG. 3 is a combined schematic and block diagram of a second alternative embodiment thereof; and FIG. 4 is a combined schematic and block diagram of a third alternative embodiment of the invention.

DESCRIPTION OF THE PREFERRED EMBODIMENTS

Figure 1:
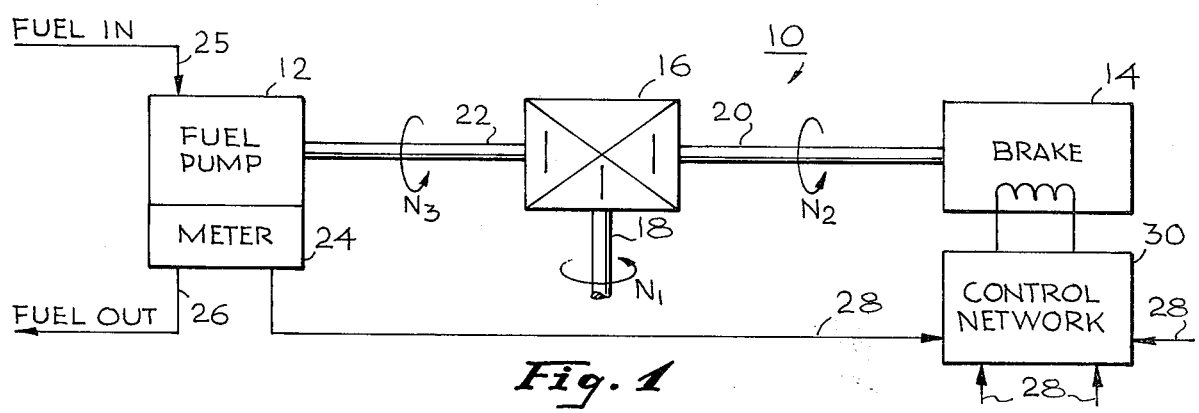
FIG. 1 is a block diagram of a fuel delivery system in accordance with the invention.

In FIG. 1, a system 10 in accordance with the invention is shown comprising a fuel pump 12, preferably of the positive displacement type, and control apparatus 14, shown as an electromagnetic brake, intercoupled via a differential gear mechanism 16 of conventional design having a first input shaft 18, a second control shaft 20, and a third output shaft 22. The fuel pump 12 has associated with it a metering stage 24 which may be arranged to measure fuel flow directly as it passes through the pump 12 via lines 25, 26 or may indicate fuel flow as a function of rotation of the rotor of the pump 12, as by means of a tachometer or the like. An output of the metering stage 24 is shown directed as a control signal input 28 to a control network 30 associated to vary the effect of the control apparatus 14. Other inputs 28 may apply other control functions as desired.

Figure 2:
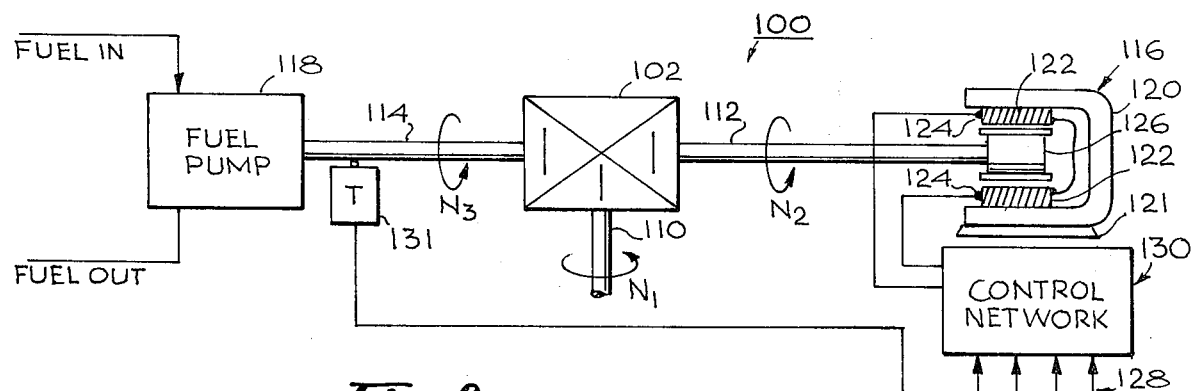
FIG. 2 is a combined schematic and block diagram of one embodiment of the system of FIG. 1.

In FIG. 2, a specific gas turbine fuel delivery system 100 is shown having a differential 102 coupled to the ends of respective rotatable shafts 110, 112 and 114. The differential 102 is driven by the shaft 110. The shaft 110 is, in one embodiment, intended to be driven at the engine accessory drive speed, indicated by the arrow labeled $N_1$, although other drive sources may be used.

The shaft 112 is adapted to be driven by the differential 102, and is connected at its opposite end to an eddy current brake 116 of any well-known type.

The shaft 114 also extends from the differential 102 and is likewise driven thereby. The opposite end of the shaft 114 is connected to a fuel pump 118 suitable to impart rotary motion thereto. The fuel pump 118 is of the fixed displacement type and may comprise any of the common fixed displacement type pumps such as gear pumps, roller pumps, piston pumps and vane pumps.

The eddy current brake 116 is shown schematically as being comprised of a fixed frame 120 mounted on a base 121 with field coils 122 and coil terminals 124. A rotor 126, preferably fabricated of a copper alloy, is fixedly attached to the end of the shaft 112 so as to rotate therewith. The field coils 122 are connected for excitation by a control current from an electrical control network 130 having various inputs 128. The nature of the control network is outside the scope of this invention and may be of conventional design. However, it has been found that the present invention may be used to advantage with a control network that determines the control current as a function of, for example, throttle position, ambient temperature, gas generator speed and fuel flow. One of the inputs 128 is shown derived from a tachometer 131 which measures $N_3$, the speed of the shaft 114 which is directly related to fuel flow.

The differential 102 comprises gear means for providing an output shaft speed to drive the fuel pump 118 as a function of the engine speed and the mechanical load provided by the eddy current brake 116. In operation, the shaft 110 may be rotated by the engine at a speed $N_1$. The shaft 112 is driven by the differential 102, and the rotational speed of the shaft 112 depends on the mechanical load applied to the shaft 112 by the eddy current brake 116. For example, if the engine speed is to be increased, the electrical control network 130 supplies the current to the eddy current brake 116 to energize the coils 122 and to thereby increase the mechanical load on the shaft 112. The resultant retarding torque will reduce the shaft 112 speed $N_2$. The shaft 114 will then be rotated at a speed $N_3$, responsive to the new speed of the shaft 112. This increases fuel delivery from the fuel pump 118 by causing it to rotate faster. As the engine speed picks up to the increased level selected by the operator, the increase is sensed by the control network 130, which acts to reduce the current to the brake 116 so that the proper steady state flow of fuel through the fuel pump 118 is maintained in accordance with speed, load, temperature and other operating conditions.

Turning now to FIG. 3, an alternative embodiment 140 is shown. In this embodiment, a differential drive is employed with control being effected through a fluid control mechanism. Such a system avoids vulnerability from electrical system failure and effects economy of structure by utilizing the lubrication system pump.

An engine-driven shaft 110 is connected so as to drive a differential 102 and thereby to drive shafts 112 and 114, which are also connected to the differential 102. The shaft 114 is connected at its opposite end to a fuel pump 118 of the fixed displacement type, as in FIG. 2.

Connected to the opposite end of the shaft 112 is a control pump 142. An adjustable valve 144 is provided across the output of the pump 142. It is contemplated, though not required, that the pump 142 be that which is used to circulate lubricating oil to the engine. A throttle 146 is shown mechanically linked to the valve 144. The control pump 142 performs a function similar to that of the eddy current brake 116 in the embodiment of FIG. 2, whereby a mechanical load is varied in response to an externally-controlled input signal. Thus, for example, when an operator depresses the throttle 146 so as to increase engine speed, the valve 144 constricts the output port of the pump 142, providing an increased impedance which slows the rotation of the pump 142 and thereby the associated shaft 112. The speed of the shaft 114, and therefore that of the fuel pump 118, is increased correspondingly by virtue of the differential gear mechanism 102.

FIG. 4 illustrates another embodiment 150 of the invention which corresponds to a variation of the arrangement of FIG. 2; except that instead of using an eddy current brake in which the frame member is fixedly mounted, an eddy current coupler 152 is employed. The housing of the coupler 152 includes field coils 154 connected by slip rings 156 to an associated electrical control network 130. The housing of the coupler 152 is connected for rotation with a coupler input shaft 158. The shaft 158 rotates at speed $N_4$ and may be coupled to any suitable drive source. As one example, it may be coupled through different ratio gearing to the same drive as is the shaft 110. In a manner similar to that shown and described for the arrangement of FIG. 1, the speed of fuel pump 118 may be varied by control of the eddy current coupler 152 from the electrical control network 130.

In this manner, the fuel flow rate is controlled in direct response to engine speed via the shaft 110 and the control function exerted by the control mechanism coupled to the shaft 112—either a controlled braking function as in FIGS. 1, 2 and 3, or a controlled function as in FIG. 4 which may be either braking or accelerating. The arrangements of the invention are simple, reliable and economical, and result in a system and operation admirably suited to the purpose described.

Although there have been described hereinabove specific arrangements of a gas turbine fuel delivery system in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. An apparatus for delivering fuel to an engine, the combination comprising:
    a. first, second and third rotatable shafts, the first shaft being coupled for rotation with a selected drive source;
    b. differential gear means connected to respective ends of the first, second and third shafts, said differential gear means being adapted to be driven by the first shaft;
    c. a first hydraulic pump having a rate of delivery proportional to the speed of rotation thereof, said pump adapted to be driven by the third shaft;
    d. driving means coupled to the second shaft selectively for accelerating and for braking the rotational speed of the second shaft, said driving means including a fourth shaft drivable at a selected speed and being coupled to the second shaft by an eddy current coupler; and
    e. electrical control means for varying the degree of coupling in the eddy current coupler between the second shaft and fourth shaft, said electrical control means having at least one electrical signal input capability, whereby the differential gear means modulates the speed of the third shaft so as to vary the rate of fuel delivery from the pump.

2. The combination defined in claim 1 further including means connected to the electrical control means for controlling the degree of coupling in response to an indication of fuel flow rate.

3. The combination defined in claim 2 including a tachometer adapted to measure the rotation of the third shaft and generate an electrical signal providing said indication of fuel flow rate.

4. An engine fuel delivery system comprising:
    a positive displacement fuel pump having input and output fuel lines coupled to deliver fuel to and from the fuel pump;
    a differential mechanism having an input drive shaft adapted to be driven by a power source and a pair of output drive shafts driven from the input drive shaft in variable speed relationship to each other;
    a variable speed device drivable from an additional drive shaft and connected to one of said output drive shafts to selectively vary the speed thereof and thereby control the speed of the other output drive shaft, said other output drive shaft being connected to drive the fuel pump; and
    an electrical control device connected to the variable speed device to control the speed of the one output drive shaft in response to at least one electrical input.

5. The system of claim 4 wherein the variable speed device comprises an electromagnetic coupler having a first rotatable member connected to the additional drive shaft, a second rotatable member connected to the one output drive shaft, and an electromagnetic field-inducing coil for varying the degree of coupling between the first and second rotatable members; and wherein the control device is coupled to the coil to develop a controllably variable current therein.

6. The system of claim 5 further comprising a tachometer coupled to develop a signal indicative of the speed of the pump for the application to the control device to control the electromagnetic coupler in accordance with said signal.

7. The system of claim 4 further including a fuel flow meter connected for measuring the rate of fluid flow through the fuel pump and generating an electrical signal in accordance with said measurement for application to the control device.

* * * * *